Dec. 11, 1962 J. JEROME 3,067,802
METHOD AND APPARATUS FOR TURNING BACK CABLE SHEATH
Filed Jan. 25, 1960
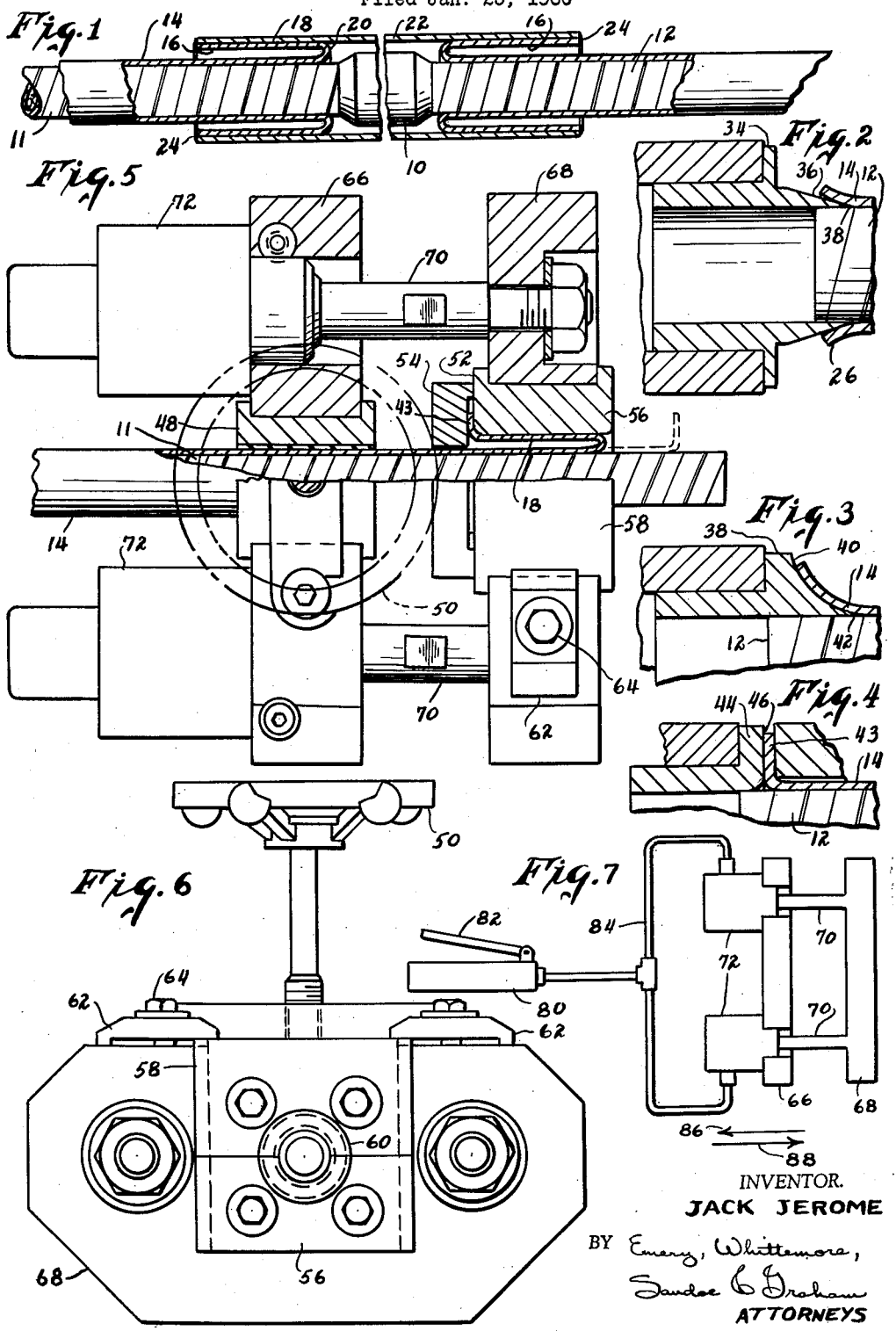
INVENTOR.
JACK JEROME
BY Emery, Whittemore,
Sandoe & Graham
ATTORNEYS

United States Patent Office 3,067,802
Patented Dec. 11, 1962

3,067,802
METHOD AND APPARATUS FOR TURNING BACK CABLE SHEATH
Jack Jerome, East Williston, N.Y., assignor to General Cable Corporation, New York, N.Y., a corporation of New Jersey
Filed Jan. 25, 1960, Ser. No. 4,240
11 Claims. (Cl. 153—80.5)

This invention relates to electric cables sheathed with ductile metallic sheaths and, more particularly, to improved method and apparatus for turning back the end of such a cable sheath to form an integral, overlying concentric ferrule spaced radially outwardly from the sheath.

Cables having an overlying protective metal sheath, such as lead sheath, are known to the art. The lead sheath commonly is extruded directly onto the cable core to encase the core within a close-fitting, flexible, impervious, covering.

In the jointing of two lengths of lead sheathed cable during installation thereof, it is the common practice to employ a larger lead sleeve which can be slid back over one end of one of the cables to be jointed. The cable conductors are then spliced in known fashion, the sleeve is slipped over the splice, and the ends of the sleeve, contracted in size to the diameter of the sheath, are joined to the cable sheaths by lead wipes to form an impervious joint casing.

Recently, cables having a soft annealed aluminum sheath extruded directly onto the cable core to form a close-fitting covering have been developed. Grade EC aluminum is suitable for this purpose. With an aluminum sheathed cable, cable termination or jointing involving use of a wiped metal connection to the cable sheath is not possible. While aluminum may be welded, the heat of welding a sleeve to the cable sheath would damage the cable components encased thereby.

Pursuant to this invention, joints and terminations of aluminum sheathed cable may be made by turning back the end of the sheath into an integral overlying concentric ferrule spaced radially outwardly from the sheath. The turnback may be dimensioned so that a weld may be effected at the free end of the ferrule with sufficient heat dissipation over the ferrule length to prevent the raising of the sheath temperature to that which would damage the cable components. For additional details of this type of cable construction and method of jointing cables reference may be had to the Martin H. McGrath application Serial No. 4,239, filed January 25, 1960, for "Joint for Aluminum Sheathed Cables," assigned to the assignee of the present application.

Formation of an integral ferrule on the end of aluminum cable sheath is complicated by reason of the danger of damage to the cable core components. In particular, sheathed cables contain one or more insulated conductors which would be likely to be damaged by the use of any impact process and which, of course, prevent the use of internal mandrels to assist in the formation of the ferrule. Further, impact processes would work the metal of the cable sheath over an extended portion thereof and would adversely effect the characteristics of the metal in the formed ferrule. The ferrule formed on the sheath cannot be annealed by heat treatment, because such treatment would damage the enclosed cable core.

Further, in order that the formed ferrule be adaptable to cable terminations and joints utilizing an overlying concentric sleeve or casing, the outer dimensions of the ferrule must be held to close dimensional tolerances. Many impact forming processes are not directly suitable for such dimensional control.

In addition, it is desirable that means be provided to permit ferrule formation in the field by easily transportable equipment.

It is therefore one object of this invention to provide an improved method of formation of a ferrule on a cable encased in a ductile sheath.

It is a further object of this invention to provide an improved method and means for the formation of an integral overlying concentric ferrule on aluminum sheathed cable for jointing and terminating purposes by turning back a portion of the aluminum sheath.

It is a further object of this invention to provide an apparatus which is capable of forming a ferrule by turning back a portion of the ductile sheath, and which can be easily transported and operated for field use.

In accordance with these objects, the preferred method of this invention comprises flaring the end of the sheath into a radially extending flange, gripping the flange, and pulling the flange back over the cable sheath to turn back the end of the sheath and thus form an overlying concentric ferrule. During the turning back of the sheath the progressively formed ferrule is gripped by a concentric grip to concentrate the stress at the bend of the turn-back so that the only metal being worked is the metal at the bend.

The apparatus for carrying out this method comprises a concentric grip to grip and hold the cable at a point spaced from its end. A flange grip is provided to grip the radially extending flange formed on the end of the aluminum sheath. A concentric ferrule grip having a bore matching the desired outer diameter of the ferrule is provided to concentrically grip the ferrule as it is formed during turnback of the sheath. The concentric ferrule grip concentrates the working stress at the bend of the turnback and insures uniform outside diameter for the ferrule. The flange and ferrule grips are mounted together and axially aligned with the cable grip. Means are provided to move the flange and ferrule grips as a unit toward the cable grip in a power stroke turning back back the end of the aluminum sheath into an overlying concentric ferrule.

Other objects and advantages of this invention will be pointed out hereinafter.

This invention will be more clearly understood by reference to the following description taken in combination with the accompanying drawings showing an illustrative embodiment, in which:

FIGURE 1 is a cross sectional view of a cable joint;

FIGURES 2, 3 and 4 are cross sectioned views of flaring dies illustrating a method of forming the radially extending flange on the end of the cable sheath;

FIGURE 5 is a partially cross sectioned top view of an apparatus for turning back a cable sheath in accordance with this invention;

FIGURE 6 is an end view of the apparatus shown in FIGURE 5; and

FIGURE 7 is a schematic diagram of the apparatus shown in FIGURE 5.

In FIGURE 1 there is shown a cable joint which comprises a splice 10 of the cable core components of cables 11 and 12 respectively. While a joint connecting two lengths of cable has been selected for purposes of illustration, it will be understood that the present invention also is applicable to terminating lengths of cable by connection to terminals. A cable joint is, in effect, two cable terminations. Each cable core is encased within a close-fitting continuous metal sheath 14. In accordance with this invention the end of the sheath is turned back into an overlying concentric ferrule 16 comprising a concentric flange 18 integrally formed with and supported by a U-shaped bend 20 of the sheath material. An annular joint casing sleeve 22 overlies the cable joint extending between the ferrules on the two cables to be terminated and is bonded at its end to the free ends of the ferrules by annular weld beads 24.

A preliminary procedure to the actual formation of the ferrule on a cable sheathed in a ductile material such as extruded soft aluminum may be understood by reference to FIGURES 2, 3 and 4 simultaneously.

In FIGURES 2, 3 and 4 there is shown a cable 12 having an aluminum sheath 14 of soft annealed aluminum extruded over the cable in an encasing protective sheath. Depending on the kind and size of the cable, the voltage, the number of conductors, and other factors, the length of cable core exposed in turning back the sheath to form the ferrule may or may not be sufficient for the splicing of the insulated conductors. If not, then a short length of sheath will be removed before forming the ferrule. When this is done the end of the sheath usually will have a slight flaring lip. The cable sheath is usually removed by scoring the sheath circumferentially, slitting the sheath back to the scoring, and then lifting and tearing off the end of the sheath, while operation deforms the sheath into the small lip as shown at 26. The presence or absence of the lip has no substantial effect on the process of the present invention, but may have some effect on the number and shapes of the flaring dies used.

Referring to FIGURE 2, the annular die 34 has a wedge-shaped flaring surface 36 terminating in an edge which defines an annular aperture 38 having a diameter matching the diameter of the cable core. The edge of the flaring die is pressed under the lip at the end of the sheath to initiate flaring of the sheath into a flange.

The formation of a flange is continued by removal of die 34 and insertion of the edge of a second die 38 under the sheath. As shown in FIGURE 3, the flaring die 38 is provided with a tapered surface 40 extending from an apex 42 which defines the annular aperture fitting over the cable core components. When the die 38 is pressed under the sheath, the sheath is further flared.

The flare may then be formed, as shown in FIGURE 4, into a radially extending flange 43 by the annular die 44 having a radially extending shoulder 46 which can be pressed against the flared end of the sheath.

In forming the flange 43, pressure may be applied to the several dies by the same apparatus which is to be used in forming the concentric ferrule. Apparatus suitable for this purpose is shown in FIGURES 5, 6 and 7.

In FIGURES 5, 6 and 7 there is shown a cable having core components 11 protected by sheath 12. A split clamp comprising jaws 48, each having a semi-circular aperture, is provided to hold the cable by gripping the sheath thereof under a frictional force determined by the pressure forcing the split jaws together. The pressure is adjustably controlled for example by a hand wheel 50. In general, it is preferable to limit the maximum torque applied to the split clamp to that which is necessary to hold the cable, so as to avoid distortion of the sheath and possible damage to the components of the cable core. This may be approximately 20-foot pounds with the usual aluminum sheath thickness of 50 to 150 mils. It has been found advantageous in providing the necessary frictional engagement of the cable sheath by the concentric grips to line the cable clamp with suitable friction material, e.g. emery cloth placed back to back and cemented or otherwise adhered together.

Axially aligned with the cable clamp 48 is a flange clamp comprising an annular clamp face 52 and concentrically arranged dogs 54 to circumferentially clamp the flange 43 against the face 52. A friction grip for the ferrule is provided by the split grips comprising section 56 and 58 each having a semi-circular aperture 60 of radius suitable for the application intended. Dogs 62 are provided to bear upon the split ferrule grips to lock them in position after bolts 64 have been tightened. It has been found convenient to have the ferrule grip also define the clamp face 52 of the flange clamp.

In order to provide means for moving the flange grip towards the cable grip, the cable grip 48 is mounted within a stationary block 66. The flange grip is mounted on a relatively movable block 68 which is coupled to the stationary block through rods 70 of pistons operable within hydraulic cylinders 72. Thus, as the hydraulic cylinders are actuated in a power stroke, the movable block 68 is pulled towards the stationary block 66, with concomitant movement of the flange 43 clamped thereto, resulting in turning back the flanged sheath into an integral overlying ferrule 18. Simultaneous movement of the ferrule grip ensures that the flange of the ferrule is accurately and uniformly dimensioned and ensures that the stress concentration during ferrule formation occurs only at the bend of the ferrule.

If the ferrule length desired exceeds the stroke of the hydraulic cylinders, the ferrule can be formed by cycling the apparatus. To so do, the cable grip may be released following the power stroke, the hydraulic cylinders returned to their normal position by such means as spring return, the cable clamps retightened and a second stroke of the device made. In this way, the cable may be inched along to provide the necessary ferrule length. The ferrule grip 56 desirably will have an axial length at least equal to the maximum ferrule length desired to be formed so as to ensure concentration of the stress at the point of the bend during ferrule formation. The usual ferrule length is in the range of 1 to 6 inches, and it is convenient therefore to provide a ferrule grip 6 inches long.

The hydraulic cylinders may be actuated by pump pressure if the cable sheath ferrule is formed in a central depot or in the manufacturing plant. However, in many applications, it is desirable that the ferrule be formed in the field. In such applications, the embodiment shown in FIGURE 7 may be advantageously employed.

In FIGURE 7 there is illustrated diagrammatically the stationary block 66 and the movable block 68 coupled therethrough through the piston rods 70 of the hydraulic cylinders 72. Hydraulic pressure to controllably operate the hydraulic cylinders is supplied from a hand pump 80, having a manually operated pump handle 82, through hose couplings 84. The pressure stroke moves the movable block 68 towards the stationary block, as indicated by arrow 86, and return to the normal position, as indicated by arrow 88, is effected by a spring return within the hydraulic cylinders when the cable clamp is released.

The ferrule is formed in the manner described and then completed for use in cable termination by cutting off the radially extending flange by a circumferential cut adjacent thereto.

Formation of a ferrule by the method of this invention provides a ferrule which is not excessively work hardened. For example, when the sheath is formed of soft, fully annealed aluminum extruded on the cable core, the ferrule is found to be only about half hard. Ferrules tested were found to have a tensile strength of 16,000 p.s.i. and 5 percent elongation (10 percent elongation for the soft sheath). Thus, the desirable properties of the annealed aluminum sheath are not lost by working thereof during ferrule formation. The thickness of the sheath is not materially altered during the turning back operation. However, the sheath is being expanded to a larger diameter and this fact, plus the loss of a small amount of metal as a result of cutting off the radially extending flange, means that the length of the ferrule will be somewhat less than the length of cable core exposed. The actual decrease in length of the ferrule as compared with the length of cable core exposed will depend on the relative diameters of the cable sheath and the ferrule.

The ferrule formation exposes the cable core which can then be stripped for splicing or for other termination procedures in conventional fashion. It will be noted that the core remains untouched throughout ferrule formation. Thus, core damage is avoided. The use of flaring instruments to form the flange does not adversely effect installation procedures since, even if slight damage to the core insulation is made by the flaring instruments, the position of such damage is at the very tip of the cable where the insulation necessarily must be removed for making connection to the conductors.

It will be noted that the method of ferrule formation, specifically illustrated by aluminum sheathed cable, is also applicable to other ductile sheath material such as copper, lead, magnesium and, in some cases, malleable iron.

This invention may be variously embodied and modified within the scope of the subjoined claims.

What is claimed is:

1. The method of preparing aluminum sheathed cable for termination which comprises forming a radially extending flange upon the end of said sheath while leaving the cable within the sheath undisturbed, gripping the flange and exerting a pulling force on said flange axially of the cable by moving the flange gripping means back along the cable to turn back such sheath in a concentric annular ferrule while leaving the cable within the sheath undisturbed.

2. The method in accordance with claim 1 which includes concentrically restraining the turned back portion progressively during the turning back operation to thereby concentrate working stress at the bend of said sheath.

3. The method in accordance with claim 1 which includes removing said flange from the turned back portion at a position adjacent said flange.

4. The method of preparing cable sheathed with ductile metal for termination which comprises flaring the end of the sheath while leaving the cable within the sheath undisturbed and exerting a pulling force axially of the cable on the flared portion of the sheath to turn back the sheath in a concentric annular ferrule while leaving the cable within the sheath undisturbed.

5. The method in accordance with claim 4 which includes progressively supporting the turned back portion of the sheath.

6. Apparatus for forming an overlying concentric ferrule on a sheathed cable having a radially extending flange on the end thereof comprising means to grip said cable on the exterior of said sheath, means to grip said flange, and means for moving said two gripping means together to pull the end of said sheath axially in a direction away from the end of the cable to turn back said sheath in an overlying ferrule concentric with the sheath.

7. Apparatus in accordance with claim 6 which includes means to grip said ferrule during turnback thereof to concentrate the working stress at the bend of the sheath.

8. Apparatus in accordance with claim 6 in which said moving means comprises hydraulic pistons and which includes manually operated means for controlling movement of said pistons.

9. Apparatus in accordance with claim 7 in which said ferrule gripping means comprises a concentric grip having a diameter matching the desired diameter of the ferrule and having an axial length exceeding the desired length of the ferrule.

10. Apparatus in accordance with claim 7 in which said ferrule gripping means and said flange gripping means are movable simultaneously.

11. Apparatus in accordance with claim 7 in which said ferrule gripping means, said cable gripping means and said flange gripping means are axially aligned.

References Cited in the file of this patent

UNITED STATES PATENTS

| 2,458,854 | Hull et al. | Jan. 1, 1949 |
| 2,800,344 | Wolcott | July 23, 1957 |
| 2,857,666 | Beyer | Oct. 28, 1958 |

FOREIGN PATENTS

| 1,056,815 | Germany | May 6, 1959 |
| 542,803 | Great Britain | Jan. 28, 1942 |